Figure 1:
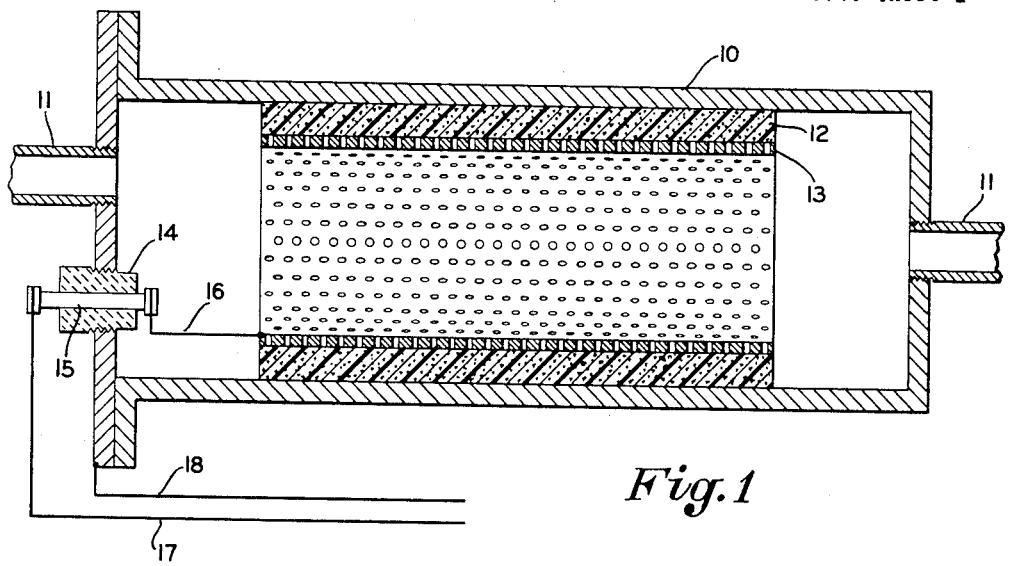

June 26, 1956  O. D. JORDAN  2,752,586
DEVICE FOR DETECTION OF WATER IN OIL
Filed Jan. 20, 1954  2 Sheets-Sheet 1

INVENTOR.
*Otis D. Jordan*
BY *Frease & Bishop*
ATTORNEYS

United States Patent Office 2,752,586
Patented June 26, 1956

2,752,586

DEVICE FOR DETECTION OF WATER IN OIL

Otis D. Jordan, Zanesville, Ohio, assignor to Ohio Ferro-Alloys Corporation, Canton, Ohio, a corporation of Ohio Application January 20, 1954, Serial No. 405,113

7 Claims. (Cl. 340—235)

The invention relates to devices for detecting the presence of water in oil, and more particularly to a device especially adapted for the detection of minute amounts of water in transformer insulating oil.

A very slight amount of water in the insulating oil of a transformer is a serious disadvantage. As little as twenty-five parts of water to one million parts of insulating oil is sufficient to reduce the dielectric strength of the oil to the minimum safe value, and sixty parts of water per million parts of transformer oil will not only ruin the oil's dielectric value, but will usually result in an electrical explosion within the transformer unless discovered in time.

In addition to the immediate danger of electrical short circuits within the equipment subjected to oil containing water, the water will also penetrate the other insulating media and permanently reduce its insulation value. It is, therefore, very desirable that means be provided for quickly detecting the presence of the slightest amount of water in insulating oil in order to prevent such damage to equipment.

Accordingly, the primary object of the invention is to provide a device that will constantly sample the insulating oil of a transformer, or other apparatus and instantly respond to any water that appears in sufficient quantity to lower the dielectric strength of the oil to a point near the minimum safe limit.

Another object is to provide such a device whereby the presence of water in the insulating oil will cause warning devices to operate and/or cause electrical power to be disconnected from the transformer or other equipment that may be subject to damage by the presence of water in the insulating oil thereof.

A further object is to provide a device of the character referred to comprising a water-sensitive cell through which insulating oil is adapted to be circulated, such cell including a case of suitable metal having a hygroscopic separator in contact therewith and a screen of suitable metal in contact with the hygroscopic separator and separated thereby from the case, both the case and the screen being connected by electric conductors to suitable devices such as a contact-making microammeter, an electronic control relay and/or a control relay for operating warning signals, opening an electric circuit and the like.

Figure 2:
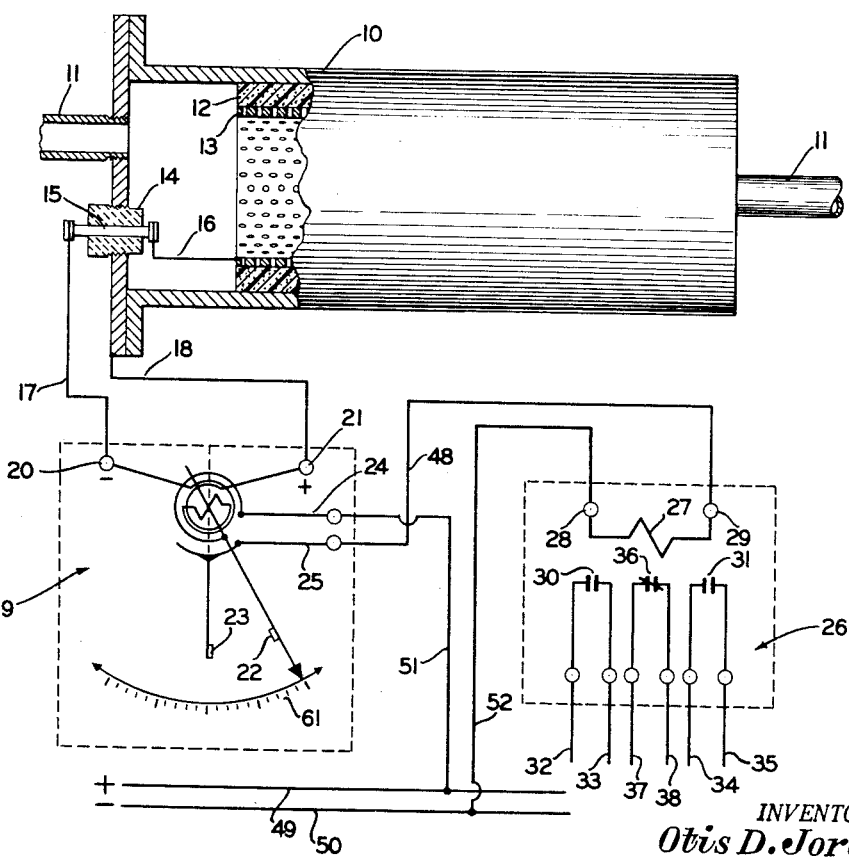
Figure 3:
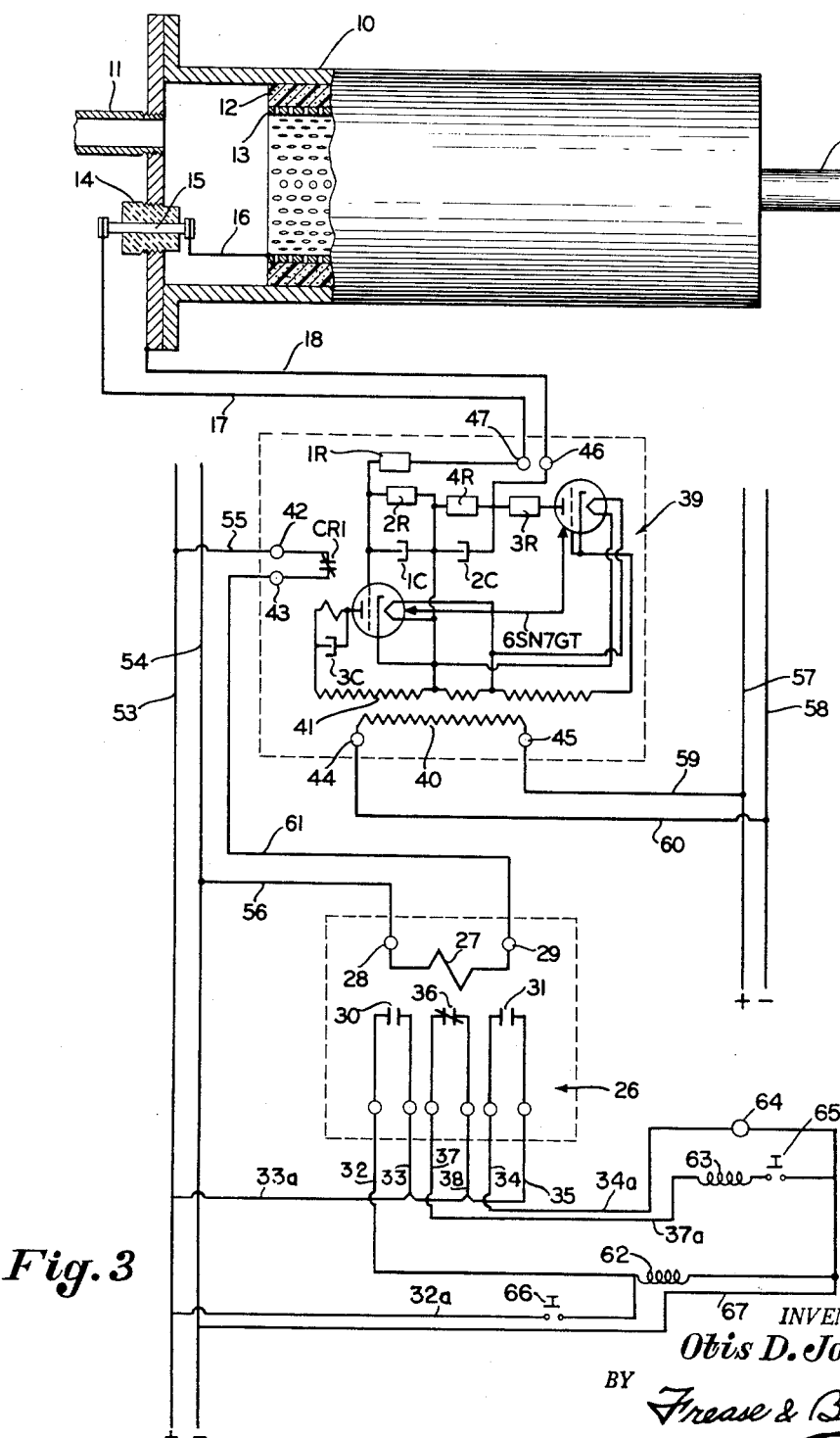

The above objects together with others which will be apparent from the drawings and following description, or which may later be pointed out, may be attained by constructing the invention in the manner hereinafter described in detail and illustrated in the accompanying drawings, in which:

Fig. 1 is a longitudinal sectional view through a water-sensitive cell forming the essential part of the invention;

Fig. 2 a diagrammatic view showing the connection of the water-sensitive cell to a contact-making microammeter and a typical control relay; and, Fig. 3 a diagrammatic view showing the connection of the water-sensitive cell to an electronic control relay and a typical control relay.

Referring first to Fig. 1 of the drawings, a water-sensitive cell is shown forming the most essential portion of the invention. This cell comprises a metallic case 10, which may be of cylindrical or other elongated shape, closed on all sides except for the inlet and outlet pipes 11 communicating with opposite ends of the case for permitting constant circulation of insulating oil, from a transformer or other equipment, through the case.

Located in contact with the inner wall of the case 10, is a hygroscopic separator 12, a metallic screen 13 being in contact with the hygroscopic separator, and separated thereby from the case 10.

The case 10 may be constructed of copper and the screen 13 of zinc, these being given merely as examples, as other metals will work equally well. The case and screen may be either of similar or dissimilar electro-conductive materials, depending upon the nature of the devices to which they may be connected as later described.

The hygroscopic separator may be constructed of any material that possesses high dielectric strength when dry, and which will readily absorb water on contact therewith, even when saturated with and immersed in oil.

Although it is not the intention to limit the invention to one specific substance for such use, cellulose sponge possesses the desired qualities to a marked degree, and is given as an example of the material which may be used by the hygroscopic separator, but it should be understood that many hygroscopic materials, both organic and inorganic, possess the required qualities, and may be used for forming the separator 12.

It should also be understod that it is not the intention to limit the construction of the water-sensitive cell to that shown in the drawings, and that this cell may be of any form that provides electro-conductive bodies separated by, and in mutual contact with, a hygroscopic separator, the several elements being in contact with the oil being tested.

An insulation bushing 14 is located through one end of the case 10 and a conductor 15 is located within the bushing and extends through opposite ends thereof. The inner end of the conductor 15 is connected by a wire 16 to the screen 13, and the outer end of the conductor 15 is connected to the wire 17 which, together with the wire 18 which is connected to the case 10, may be optionally connected to various devices for operating a warning signal and/or causing electric power to be disconnected from the transformer or other equipment which may be subject to damage by the presence of water in the insulating oil thereof.

One such device, as shown in Fig. 2, may be a contact making microammeter generally indicated at 19. This microammeter may be of conventional construction and the specific design thereof is not in itself a part of this invention.

The wires 17 and 18 may be connected to the terminals 20 and 21 of the microammeter 19, the construction of which is such that when direct current is applied to said terminals with respect to the proper polarity, the moving contact 22 will deflect and make contact with the adjustable, normally stationary, contact 23 and thus complete a conducting circuit from the wire 24 to the wire 25 thereof.

Another device which may be employed in connection with the water-sensitive cell is a typical control relay, generally indicated at 26 in Figs. 2 and 3. This control relay may be of conventional construction and the specific design thereof forms no part of the present invention.

The control relay 26 is provided with an operating coil 27 connected at opposite ends to the terminals 28 and 29. A pair of normally open contacts 30 and 31 are provided in this relay, the contacts 30 being connected to wires 32 and 33 and the contacts 31 being connected to wires 34 and 35. Normally closed contacts 36 are also provided in the relay and connected to wires 37 and 38.

The wires 32 and 33, 34 and 35, and 37 and 38 may be connected to various warning signal devices or make and break devices of conventional design so as to give alarm signals or open or close other circuits as desired when the coil 27 is energized.

A control relay, the specific design of which in itself forms no part of the invention, is indicated generally at 39 in Fig. 3. This electronic control relay includes a transformer, the primary and secondary coils of which are indicated at 40 and 41 respectively, a vacuum tube 6SN7GT, a plate-current relay CR1 with normally closed contacts connected to the terminals 42 and 43, a suitable arrangement of resistors indicated at 1R, 2R, 3R and 4R, a suitable arrangement of capacitors 1C, 2C and 3C, and provision for connection of a suitable alternating current to the terminals 44 and 45 of the primary winding of the transformer for operation thereof.

The electrical values of the above-mentioned parts of the electronic control relay are such that when any resistance exceeding a predetermined value (for example any resistance exceeding 500,000 ohms) is connected from the terminal 46 to the terminal 47, the contacts of the plate-current relay CR1 will be held open.

When the external resistance connected to the terminals 46 and 47 drops to a value below the predetermined value the electronic relay functions to allow the contacts of the plate-current relay CR1 to return to their normally closed position completing a circuit between terminals 42 and 43.

A specific example of one application of the invention is shown in Fig. 2, in which the wires 17 and 18 from the water sensitive cell are connected to the terminals 20 and 21 respectively of the contact-making microammeter 19. The wire 25 of the microammeter is connected by the wire 48 to the binding post 29 of the control relay 26. An electric power circuit of the proper type required by the control relay 27 is indicated by the wires 49 and 50. The wire 49 is shown connected by wire 51 to the wire 24 of the contact-making microammeter 19, and the wire 50 is connected by wire 52 to the binding post 28 of the operating coil 27 of the control relay 26.

With the arrangement shown in Fig. 2, when dry oil is passed through the water-sensitive cell 10 there is no change in the electrical characteristics of the cell. However, if the oil contains water in an objectionable amount, the water is instantly absorbed by the hygroscopic material of the separator 12. Since even the purest water is a weak electrolyte with an ion product of the order of $1.0 \times 10^{-14}$ at 25° C., and since there is a substantial difference of reduction potential between zinc and copper, an electromotive force is generated between the case 10 and the screen 13, and hence between the wires 17 and 18 leading to the microammeter 19.

This electromotive force will be, within limits, proportional to the water absorbed by the hygroscopic separator 12 and will move movable contact 22 of the microammeter in proportion. When the deflection of the movable contact 22 is sufficient to cause it to make contact with the adjustable contact 23, an electrical circuit will be completed between wires 24 and 25, and since the wire 25 is connected to the coil 27 of the control relay 26, and since the electric power circuit 49—50 is connected to the wire 24 of the microammeter and to the coil 27 of the control relay, the coil 27 will be energized and the contacts 30, 31 and 36 will perform their intended warning and actuating functions.

In this application the water sensitive cell 10 functions as a simple galvanic cell with an electromotive force being generated therein that is in proportion to the amount of water reaching the cell by way of the oil being tested. In this application of the invention it is necessary that the water sensitive cell be constructed with the case 10 and screen 13 of dissimilar electro-conductive materials having a definite difference of reduction potential.

By way of example, another application of the invention is illustrated in Fig. 3. In this arrangement the wires 17 and 18 from the water-sensitive cell 10 are connected to the binding posts 47 and 46 respectively of the electronic control relay 39. An electric power source of the proper type as required by the coil 27 of the control relay 26, is indicated by the wires 53 and 54. The wire 53 is connected by wire 55 to the binding post 42 of the electronic control relay 39 and the wire 54 is connected by wire 56 to the binding post 28 of the coil 27 of the control relay 26.

A suitable power source, indicated by the wires 57 and 58, is connected to the primary 40 of the transformer of the electronic control relay 39 as by the wires 59 and 60 respectively connected to the terminals 45 and 44 of the transformer. The binding post 43 of the plate-current relay CR1 is connected by wire 61 with the binding post 29 of the coil 27 of control relay 26.

When dry oil is passed through the water-sensitive cell, the resistance between the wires 17 and 18 remains near infinity and the electronic relay 39 functions in such a manner as to hold its relay contacts CR1 open. However, if the oil contains water, the water is instantly absorbed by the hygroscopic material of the separator 12 upon contact therewith.

Since the specific conductance of even the purest water is of the order $5.5 \times 10^{-8}$ ohms per cubic centimeter at 25° C., the resistance between the case 10 and the screen 13 will decrease rapidly as the separator 12 absorbs water.

The resistance between wires 17 and 18 will thus fall until it is below the value at which the electronic control relay 39 can hold its contacts at CR1 open, and these contacts will close. Because of the previously described connections between the binding posts 28 and 42 and the power source 53—54, the operating coil 27 of the control relay 26 will be energized when the contacts CR1 close, and thus the contacts 30, 31 and 36 will perform their intended warning and actuating functions.

In this instance the water-sensitive cell functions as a resistance which varies in relation to the amount of water present in the oil which is being tested, and it is not necessary for the case 10 and screen 13 of the water-sensitive cell to be made of dissimilar material, in fact it is desirable, though not necessary, that the case 10 and screen 13 be both made of a neutral metal such, for instance, as platinum.

Because of the wide variation in design of transformers and other oil insulated equipment with which the invention may be employed, the manner whereby the oil is conveyed through the water-sensitive cell is not shown. It is important that a continuous flow of oil being sampled is maintained through the water-sensitive cell, either by thermal convection, or by the use of a pump which will force the oil through the cell and back to the transformer or other equipment wherein the oil performs its function as an insulating medium.

In cases where the cell 10 functions as a galvanic cell which produces an electromotive force, which in turn actuates a contact making microammeter, the moving contact 22 of the microammeter may move over a calibrated scale, as indicated at 61 in Fig. 2, and thus give constant visual indication of the water content of the oil being sampled.

In cases where the cell functions as a water-sensitive variable resistor, actuating an electronic relay, as indicated at 39 in Fig. 3, a microammeter, such as indicated at 19 in Fig. 2, may be located in series with either of the wires 17 or 18 of Fig. 3. The microammeter will thus give a constant visual indication of the water content of the oil being tested because of the current that will flow between the terminals 46 and 47, such current being inversely proportional to the resistance of the cell 10 in such instances.

The microammeter 19, the electronic relay 39 and the control relay 26 are typical of devices of this type and are shown and described only as examples of various and suitable devices for connection to the water-sensitive cell whereby the cell may perform its intended function.

The mechanical structure of the relays 26, the signal and control devices, and the means for shutting off the power to the transformer are shown on Fig. 3, and it should be understood that in the embodiment shown in Fig. 2 this construction would be the same.

Referring to the showing in Fig. 3, the wire 32 from one of the contacts 30 of the control relay 26 is connected to the power circuit breaker trip coil 62 and then through wire 32a with one wire of any suitable power source such as the positive wire 53.

A push button type make and break 66 is located in the wire 32 between the power circuit breaker trip coil 62 and the power source.

The wire 33 of the contacts 30 is connected through wire 33a with the positive wire 53 of the power source and with the wire 38 of the normally closed contacts 36 and also with the wire 35 of the contacts 31.

The wire 37 of the normally closed contacts 36 is connected by wire 37a with the close coil 63 of the power circuit breaker. The wire 34 of the contacts 31 is connected by wire 34a with the warning signal device 64.

A push button make and break 65 is interposed between the circuit breaker close coil 63 and the wire 67 which connects the warning signal 64 and the power circuit breaker trip coil 62 to the negative wire 54 of the power source.

With this arrangement, operation of the relay 26 causes operation of the power circuit breaker trip coil 62 and also operation of the warning signal device 64.

Operation of the relay also makes it impossible for anyone to reclose the power circuit breaker because its contacts 36 which are normally closed become open at the operation of the relay 26 and thereby isolate the close coil 63 of the power circuit breaker from the positive side of the operating power source.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A device for detecting the presence of water in oil, said device including an imperforate chamber with inlet and outlet connected in an oil line through which oil is continuously circulated, spaced electrodes of electroconductive material in said chamber, a separator of hygroscopic material in mutual contact with said electrodes and separating the electrodes from each other, means for maintaining contact between said hygroscopic material and the oil being tested, an electric current actuated warning and control operating means, and conductors connecting said last named means to said electrodes.

2. A device for detecting the presence of water in oil, said device including an imperforate chamber with inlet and outlet connected in an oil line through which oil is continuously circulated, spaced electrodes of dissimilar electroconductive material in said chamber, a separator of hygroscopic material in mutual contact with said electrodes and separating the electrodes from each other, means for maintaining contact between said hygroscopic material and the oil being tested, an electric current actuated warning and control operating means, and conductors connecting said last named means to said electrodes.

3. A device for detecting the presence of water in oil, said device including an imperforate chamber with inlet and outlet connected in an oil line through which oil is continuously circulated, spaced electrodes of similar electroconductive material in said chamber, a separator of hygroscopic material in mutual contact with said electrodes and separating the electrodes from each other, means for maintaining contact between said hygroscopic material and the oil being tested, an electric current actuated warning and control operating means, and conductors connecting said last named means to said electrodes.

4. A device for detecting the presence of water in oil in an electrical apparatus and for acting instantly to protect said electrical apparatus from damage due to said water, said device including a water-sensitive cell comprising an imperforate metallic case defining a chamber having inlet and outlet through which oil from the electrical apparatus is adapted to be continuously circulated, a tubular metallic screen located within said case in spaced relation thereto, a tubular separator of hygroscopic material in mutual contact with and separating said case and screen, whereby a circuit is completed between the case and screen in the presence of water.

5. A device for detecting the presence of water in oil as set forth in claim 1, in which the warning and control operating means can be set to be actuated at a predetermined limit.

6. A device for detecting the presence of water in oil as set forth in claim 1, in which the separator of hygroscopic material is formed of cellulose sponge.

7. A device for detecting the presence of water in oil as set forth in claim 1, including an electrically-actuated meter, and conductors connecting said device to said meter.

References Cited in the file of this patent

UNITED STATES PATENTS

| 1,383,233 | Parsons et al. | June 28, 1921 |
| 2,056,085 | Alles | Sept. 29, 1936 |

FOREIGN PATENTS

| 182,339 | Great Britain | July 6, 1922 |
| 540,783 | France | Apr. 22, 1922 |